United States Patent [19]

Carlson

[11] Patent Number: 4,776,708
[45] Date of Patent: Oct. 11, 1988

[54] EXTENDED CONTACT VARIABLE BALL PLANETARY TYPE WAVE GENERATOR

[75] Inventor: John H. Carlson, Danvers, Mass.

[73] Assignee: Quincy Technologies, Inc., New Haven, Conn.

[21] Appl. No.: 74,585

[22] Filed: Jul. 17, 1987

[51] Int. Cl.⁴ .................. F16C 19/50; F16H 25/06
[52] U.S. Cl. ............................. 384/447; 74/640
[58] Field of Search .......... 384/447, 445, 492, 548; 74/640, 804, 805

[56] References Cited

U.S. PATENT DOCUMENTS

| | | | |
|---|---|---|---|
| 2,906,143 | 9/1959 | Musser | 310/83 X |
| 2,930,254 | 3/1960 | Musser et al. | 74/640 |
| 2,931,249 | 4/1960 | Musser | 74/640 |
| 3,001,840 | 9/1961 | Musser | 384/447 |
| 3,199,370 | 8/1965 | Prior | 74/640 |
| 4,451,098 | 5/1984 | Farley et al. | 384/526 |

FOREIGN PATENT DOCUMENTS 3331801  1/1984  Fed. Rep. of Germany ...... 384/490

*Primary Examiner*—Stanley N. Gilreath
*Assistant Examiner*—Thomas R. Hannon
*Attorney, Agent, or Firm*—Donald N. Halgren

[57] ABSTRACT

A wave generator for a strain wave gearing device is provided wherein variant size balls are retained by a ball separator located between inner and outer ball races. A multiple number of balls on each diametrically opposed sides have the largest diameter with the balls decreasing in size away from these balls.

6 Claims, 4 Drawing Sheets

EXTENDED CONTACT VARIABLE BALL PLANETARY TYPE WAVE GENERATOR

Strain wave gearing employs three concentric components to produce high mechanical advantage and speed reduction based on the principal of nonrigid body mechanics. An elliptoidally shaped wave generator is inserted into a cylindrical strain gear distorting the strain gear into an elliptoidal form. The strain gear is in the form of a flexible tubular member open at one end with external axially extending teeth around the periphery adjacent the opening. These teeth mesh with the internal axially extending teeth on a rigid ring gear or circular spline. The number of teeth in the ring gear usually exceed by two the number of teeth in the strain gear. Since the teeth on the nonrigid strain gear and the teeth in the rigid circular spline are in continuous engagement along the major axis of the elliptoidal shape, and since the strain gear has two teeth fewer than the circular spline, one revolution of the wave shape causes relative motion between the strain gear and the circular spline equal to two teeth. With the circular spline fixed, the strain gear will rotate in the opposite direction to the wave shape at a reduction ratio equal to the number of teeth on the strain gear divided by two. The strain gear may also be the fixed member and the circular spline would be the output member and rotate in the same direction as the wave shape.

Strain wave gearing was first disclosed in U.S. Pat. No. 2,906,143 granted Sept. 29, 1959; albeit a preferred method for producing the elliptoidal wave generator is disclosed in U.S. Pat. No. 3,001,840 granted Sept. 26, 1961. In this disclosure, the wave generator is formed by pressing a thin race bearing onto an elliptoidal plug, imposing the elliptoidal shape on the inner race and simultaneously transferring this shape through the balls into the deflectable outer race. Rotation of the elliptoidal plug causes the deflection wave shape within the outer race to rotate at the same speed as the elliptoidal plug.

An alternate method of producing an elliptoidal wave generator is disclosed in U.S. Pat. No. 2,931,249 granted Apr. 5, 1960. This arrangement utilizes variant size balls to produce the deflection wave within the outer race. A pair of largest diameter balls within the bearing are diametrically opposed to form the major axis of the elliptoidal wave shape and subsequent balls deposed from the major axis are slightly smaller than the preceding balls by a prescribed amount. The inner raceway is circular and the elliptoidal wave shape is imposed on the deflectable outer race via the variant size balls. In this configuration, the rotation of the deflection wave shape within the outer race advances with the rotation of the balls. Consequently, the wave shape rotation is reduced from the circular inner race rotation by the ball planetary ratio.

U.S. Pat. No. 2,930,254 granted Mar. 29, 1960 discloses a configuration of a wave generator wherein the major axis, called lobes, is a constant radius over an extended arc to increase the tooth contact region.

In strain wave gearing, the work is transferred from the input to the output through the balls in the wave generator bearing. A conventional wave generator with an elliptoidal plug accomplishes this by camming the balls radially outward from the minor axis position to the major axis position as the input is rotated. In a ball planetary type wave generator, the balls remain in a fixed position relative to the deflection wave shape. As the deflection wave is rotated by rotating the inner race, the balls progressively advance relative to the outer race. Since the balls, in a variable ball, planetary type wave generator, get progressively larger from the minor axis to the major axis, rotation of the inner race causes the balls to move in a direction occupied by a smaller ball which cams the outer race radially outward. The efficiency at which this is accomplished is proportional to the slope of the outer race relative to a circle whose center is coincident with that of the elliptoidal shape.

It is an object of the present invention to provide a strain wave gearing device which utilizes a number of variant balls in the ball bearing assembly having a multiple number of large balls to form an extended region of contact along the major axis to obtain a more favorable slope between the balls and deflectable race.

Other objects and advantages of the present invention will become apparent from the following portion of this specification and from the following drawings which illustrate in accordance with the mandate of the patent statutes a presently preferred embodiment of the invention.

Referring to the drawings.

Figure 5:
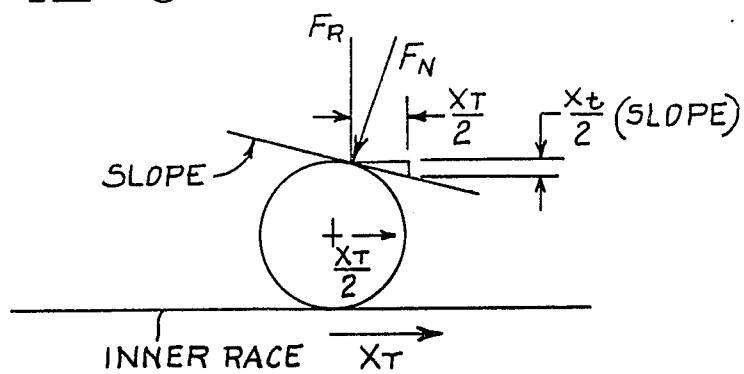
Figure 6:
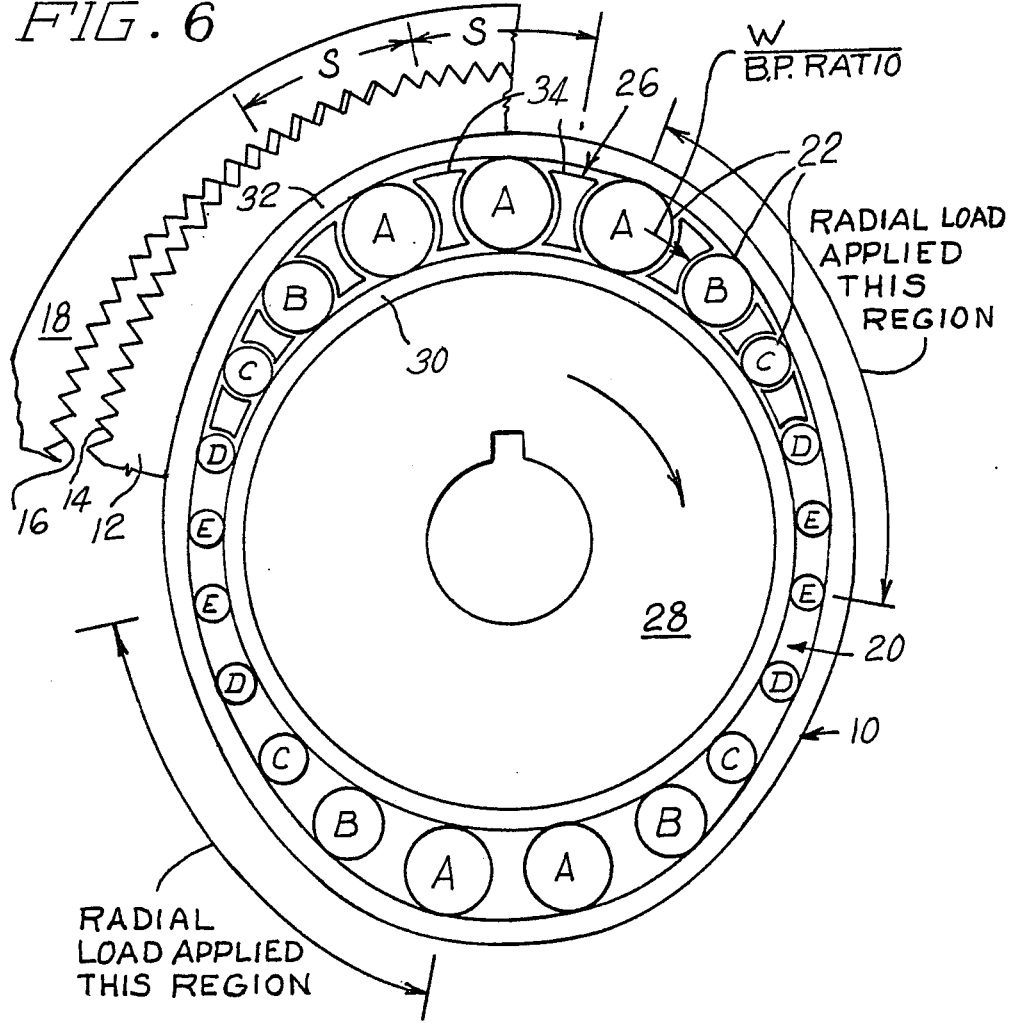
Figure 7:
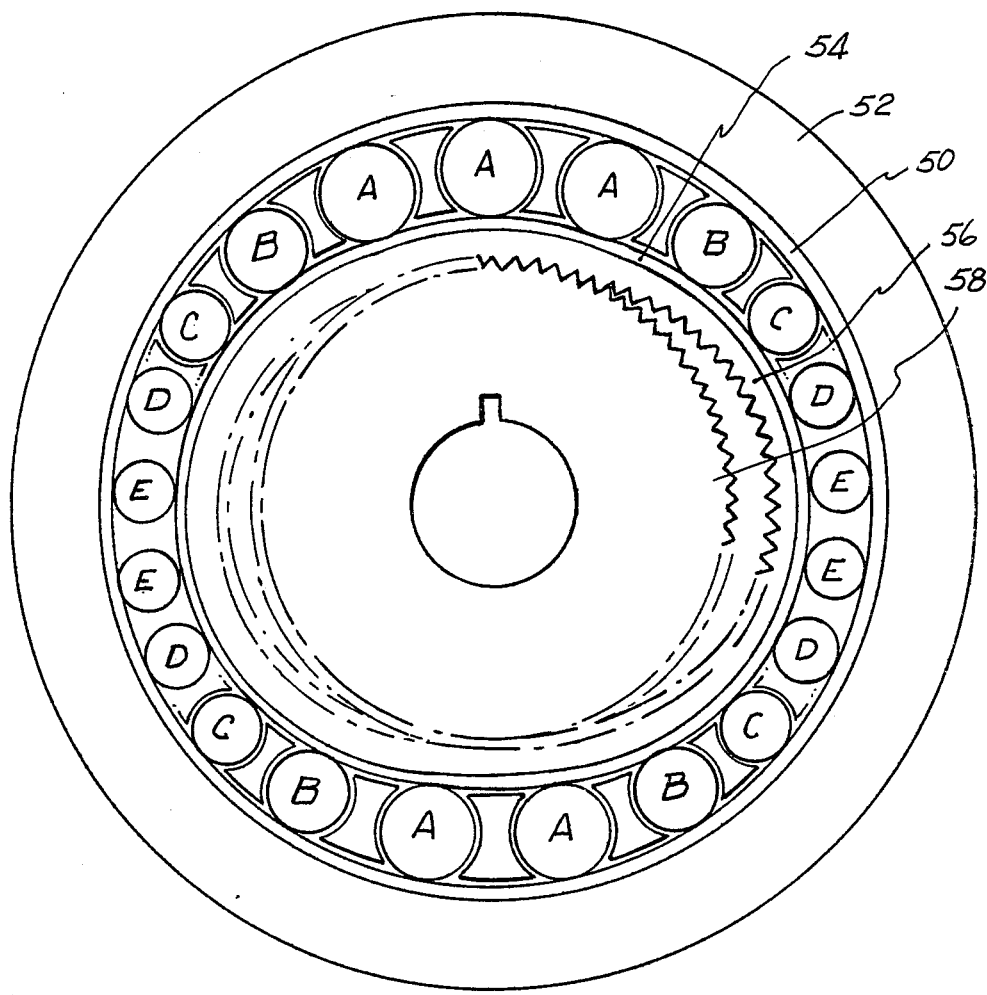

FIG. 5 depicts a ball contacting the inner and outer race at the point of maximum slope, which occurs at the midpoint between the major and minor axes, FIG. 6 depicts a strain wave gear device having a variable ball, ball planetary type wave generator with an uneven number of balls, the inner race being assembled onto a circular member and the outer race having the deflection wave imposed upon it, and FIG. 7 depicts a strain wave gear device having a variable ball, ball planetary type wave generator with an uneven number of balls, the outer race being assembled into a circular member and the inner race having the deflection wave imposed upon it.

Figure 1:
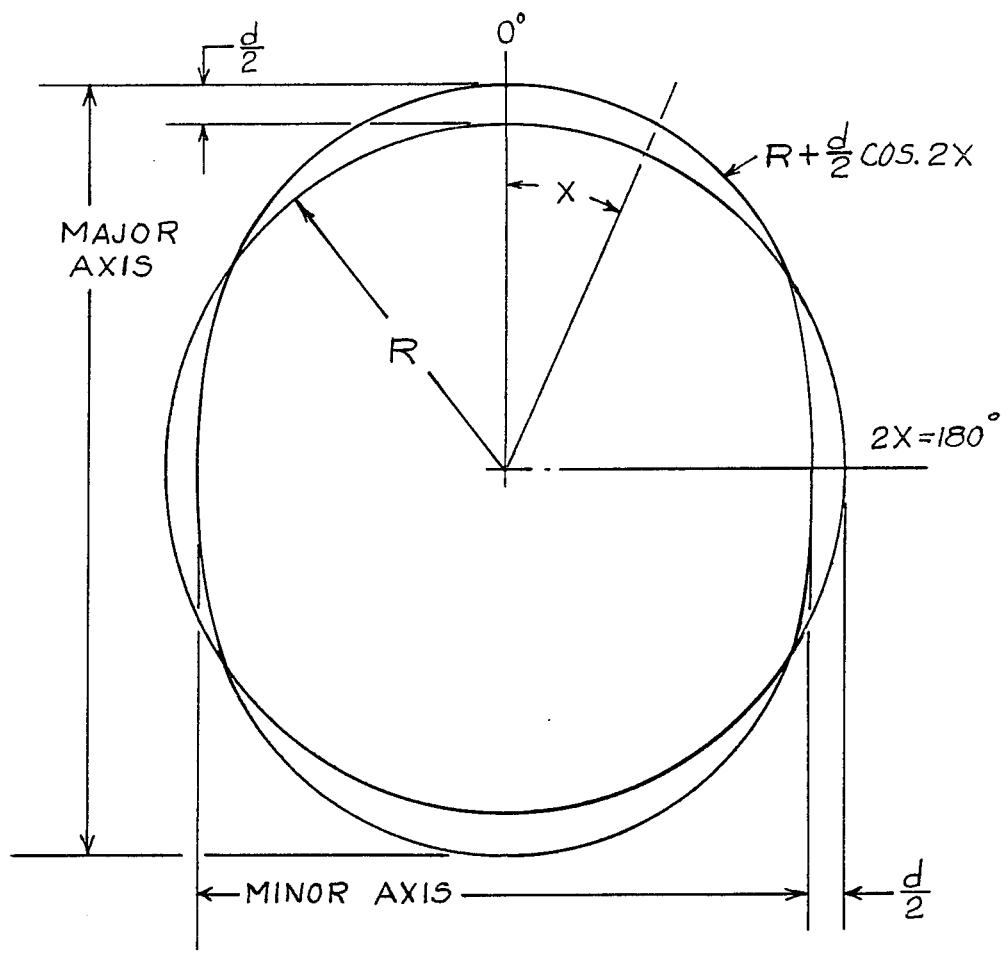
FIG. 1 depicts an imaginary ring of R radius with a deflection wave imposed on it.

In strain wave gearing, the desired elliptoidal shape of the deflection wave for two lobes imposed on the outer race (FIG. 1) can be expressed as $R+d/2 \cos 2X$ where R is the radius of the outer race in the circular state, d is the amplitude of the deflection wave and is expressed as $2R \div ratio$, X is the actual angle in degrees from the major axis. FIG. 1 depicts an imaginary ring of R radius with a deflection wave imposed on it. The major and minor axes are increased and decreased by an amount equal to d.

Figure 2:
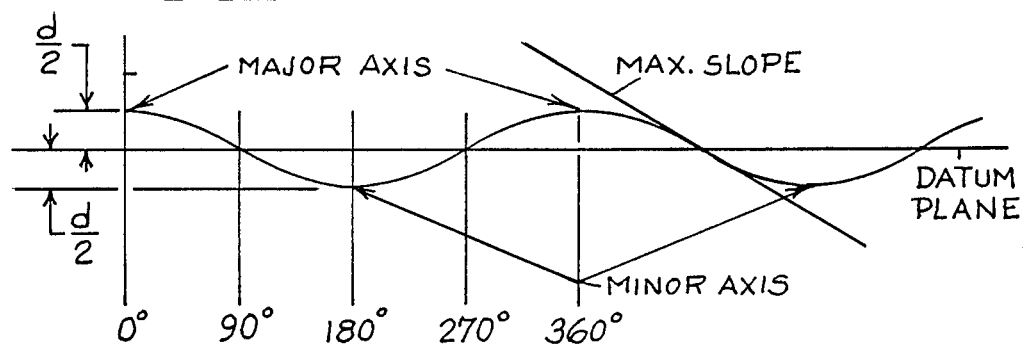
FIG. 2 depicts the wave shape with the reference ring transformed into a datum plane.

FIG. 2 shows the reference ring transformed into a datum plane and the wave becomes a cosine curve. There is accordingly a changing slope between the datum plane and the cosine curve with zero slope occurring at the major and minor axes and the maximum slope occurring at the intermediate positions. The magnitude of this maximum slope for a two lobe elliptoidally shaped wave generator is $2 \div ratio$.

Figure 3:
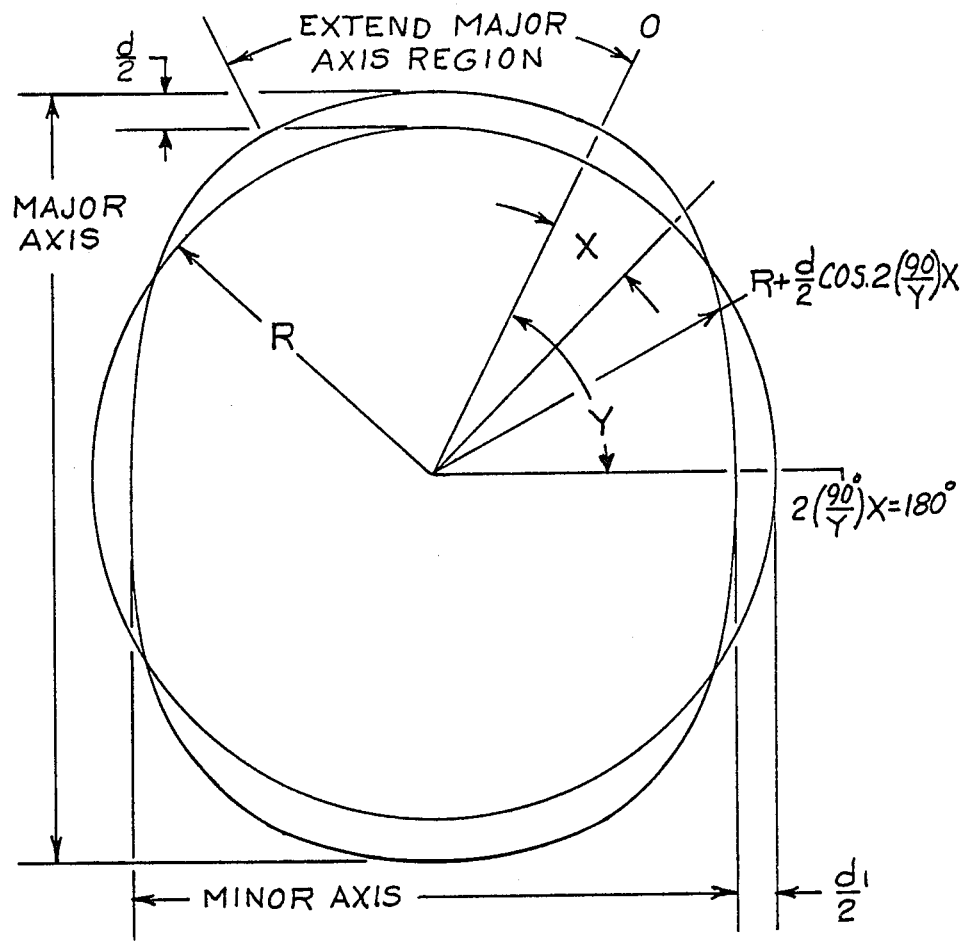
FIG. 3 depicts a wave shape in an imaginary ring with an extended major axis region.

In this configuration, each deflection wave occurs over an angle of 180 degrees. However, when the ring has an extended major axis region, as in FIG. 3, the deflection wave is foreshortened to $180° - z°$ where $z°$ is the angle of the extended major axis region. To maintain the same circumferential length in the deflected ring as the circular ring, the minor axis decreases as the the arc length z° increases. This can be expressed as:

$$d_1 = 2d \frac{(180°)}{(180° - z°)} - d$$

where $d_1$ is the total radial deflection of the ring along the minor axis.

The radial deflection along the major axis will always be the difference between the pitch diameters of the strain gear and rigid gear. Consequently, the major axis will always be the ring diameter plus d, regardless of the arc length of the major axis region.

Figure 4:
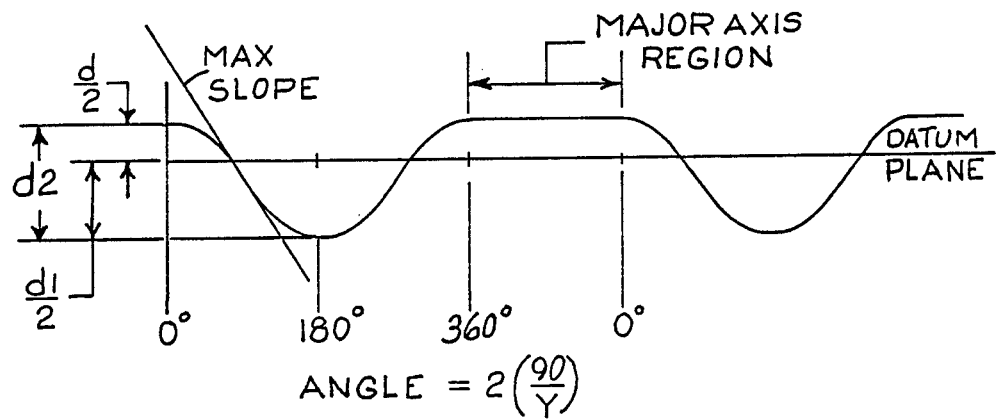
FIG. 4 depicts the wave shape of FIG. 3 with the reference ring transformed into a datum plane.

The total amplitude of the deflection wave shown in FIG. 4 is $d_2$ and is the sum of $d/2$ plus $d_1/2$. It can also be expressed as $$d_2 = d \frac{(180)}{(180 - X)}$$

The maximum slope in FIG. 4 increases with an increase in $d_2$. In addition, as the arc length along the major axis increases, the length of the deflection wave decreases which also increases the maximum slope. The maximum slope for all two lobe wave generators with an extended major axis region can be expressed as $$\text{MAX. SLOPE} = 2 \frac{(180)^2}{(180 - z)^2} \div \text{REDUCTION RATIO}$$

Without an extended major axis region, z would be zero; consequently, the maximum slope would be 2÷REDUCTION RATIO as given above.

FIG. 5 shows a ball contacting the inner and outer race at the point of maximum slope, which occurs at midpoint between the major and minor axis. When the inner race moves through a distance $X_T$, the ball will advance an amount $X_T/2$. While the ball is advancing through this distance, the outer race is cammed radially outward through a distance $X_T/2$ times the slope.

Work is a function of a force through a distance. Thus, the work done by the ball when the inner race moves through a distance $X_T$ is $X_T2(F_R)$ where $F_R$ is the radial load acting on the ball. Accordingly, as the slope increases the radial force $F_R$ will decrease to produce the same amount of work. Similarly, a decrease in the slope cause the radial force $F_R$ to increase. The higher the radial load on the ball, the greater the losses. For this reason, it is desirable to maximize the slope, keeping within the confines of good design practice to minimize the radial load on the balls to minimize the losses and enhance the efficiency of a strain wave gearing mechanism.

The possible combinations in ball sizes, ball location and number of balls in a variable ball planetary type wave generator are limitless. Consequently, the preferred embodiment uses the inner and outer raceway of a conventional wave generator bearing per U.S. Pat. No. 3,001,840. Normally, this bearing has twenty-three balls of uniform size and a separator to space the balls.

To obtain the maximum slope in the outer race to achieve the desired cam angle, the arc length along the major axis was extended. This was accomplished by having a multiple number of the largest diameter balls along each side of the major axis. It was desirous to keep the length of each deflection wave uniform. Since the separator had an odd number of pockets, it was necessary to have one more ball along one side of the major axis than the other.

A strain wave gearing device having a variable ball, ball planetary type wave generator having an unevenly extended major axis is illustrated in FIG. 6. The device has the three basic components of strain wave gearing. An elliptoidal wave generator 10 is inserted into a cylindrical strain gear 12 deflecting the strain gear 12 into an elliptical form. The strain gear 12 is in the form of a flexible tubular member open at one end with external axially extending teeth 14 around the periphery adjacent the opening. These teeth mesh with the internal axially extending teeth 16 on a ring gear 18.

The elliptoidal wave generator 10 includes a ball bearing assembly 20 made up of an odd number of variant balls 22 individually contained within discrete identical pockets of a ball pocket separator 26 located between inner 30 and outer races 32, which is pressed onto a cylindrical plug 28. Shown in FIG. 6 are the identical circumferential side partitions 34 of the separator 26 which are located equidistant (S) about the ball pocket separator 26. Such a ball pocket separator having identical pockets for receiving identical balls is illustrated in detail in U.S. Pat. No. 4,451,098.

In the strain wave gearing device illustrated in FIG. 6, five balls form the major axis regions, three on one side and two on the other labelled "A". Each successive ball away from the major axis is progressively smaller by a prescribed amount, thus "B" is smaller than "A", "C" is smaller than "B", etc. This varying ball size imposes the desired deflection wave in the outer race. For illustration purposes, the deflection wave in the outer race is grossly exaggerated causing an extreme variation in ball diameters. In actuality, the difference would be less than ten percent of the largest ball diameter.

During operation, the balls in the first and third quadrants are subjected to a radial load. The magnitude of this force is directly proportional to the output torque. When the round plug 28 is rotated, it rotates the inner race 30 causing the balls 22 to roll against the outer race 32 and translate in a circumferential direction. The ratio of inner race rotation to that of the balls and deflection wave rotation is a function of the ball planetary action. The ball planetary ratio can be calculated as 1+C/A where C is the diameter of the deflectable raceway and A is the diameter of the circular raceway.

When the balls translate, due to rotation of the circular race, they advance into a region of the deflectable race which is at a different radius. Thus, the ball continuously cams the deflectable race radially as it translates. This produces the work which causes the output to rotate as a speed reducer.

Similarly, when strain wave gearing operates as a speed increaser, i.e. low speed element functions as the input while the high speed wave generator inner race functions as the output. The torque applied to the low speed element causes the strain gear to wrap around the outer race which exerts a force on the balls normal to the surface. This force then causes the ball to move towards a point of greater radial displacement causing the balls to rotate which produces rotation of the inner race. FIG. 7 depicts a strain wave gear device the same in principle to that shown in FIG. 6, except that the outer race 50 is assembled into a circular member 52. The inner race 54 has the deflection wave imposed upon it. A deflectable gear 56 is elliptically engaged by the inner race 54 into engagement with a gear 58.

Every wave generator assembly prior to this application was comprised of either all balls within the bearing of an identical size, or the balls within the bearing of variant size with only two large balls, one on each side diametrically opposed, forming the major axis.

Applicant has determined that improved results are obtained by using a multiple number of largest diameter balls on each side to form the major axis region.

I claim:

1. A wave generator for a strain wave gearing comprising:
    a cylindrical member, and
    a bearing assembly on said cylindrical member, including:
    an inner race,
    an outer race, with at least one of the races constructed to be flexible to carry a deflection wave,
    an annular ball separator, and
    a compliment of variant size balls between the inner and outer races with a multiple number of the largest diameter balls on each side diametrically opposed with the ball sizes progressively decreasing in size away from the largest diameter ball,
    said inner race being assembled onto a circular plug and said outer race has the deflection wave imposed upon it, with the largest diameter balls defining the major axis region,
    the largest diameter balls being an even number on one side and an odd number of balls on the opposite side.

2. A wave generator according to claim 1, wherein the largest diameter balls sub-tend an arc of 15° to 60° along each side.

3. A wave generator according to claim 1, wherein one of the variant ball sizes will be at or close to the intermediate position of the deflection wave having a maximum slope thereat.

4. A wave generator according to claim 1, wherein two balls of the smallest size variant balls will be positioned, one on each side, at midpoint on the deflection wave to support the minor axis.

5. A wave generator for a strain wave gearing comprising:
    a cylindrical member, and
    a bearing assembly in said cylindrical member, including:
    an inner race,
    an outer race with at least one of the races constructed to be flexible to carry a deflection wave,
    an annular ball separator, and
    a compliment of variant size balls between the inner and outer races with a multiple number of the largest diameter balls on each side diametrically opposed with the ball sizes progressively decreasing in size away from the largest diameter ball,
    said outer race being assembled into a circular member and said inner race has the deflection wave imposed in it, with the largest diameter ball defining the minor axis region, the number of largest diameter balls is an even number of balls on one side and an odd number of balls on the opposite side.

6. A wave generator according to claim 5, wherein two balls of the smallest size variant balls shall be positioned, one on each side, at midpoint on the deflection wave to support the major axis.

* * * * *